United States Patent [19]

Slezinger et al.

[11] 4,002,934
[45] Jan. 11, 1977

[54] SENSITIVE ELEMENT OF PIEZOOPTIC MEASURING CONVERTER

[76] Inventors: Isaak Isaevich Slezinger, ulitsa Kirova 40-a, kv. 41; Georgy Mironovich Belitsky, Pervomaiskaya ulitsa, 74, kv. 101; Vladimir Alexandrovich Shiryaev, ulitsa "Iskra", 7, kv. 34; Jury Vasilievich Mironov, Nagornay ulitsa, 68, korpus 14, kv. 34, all of Moscow, U.S.S.R.

[22] Filed: May 29, 1975

[21] Appl. No.: 581,923

[52] U.S. Cl. ............................ 310/8; 310/8.7; 310/9.1
[51] Int. Cl.² .................................. H01L 41/04
[58] Field of Search .............. 310/8.3, 8.5, 8.7, 9.1, 310/9.2, 9.3, 9.4; 73/141

[56] References Cited

UNITED STATES PATENTS

| 3,140,859 | 7/1964 | Scarpa | 310/8.7 X |
| 3,299,301 | 1/1967 | Heilmann et al. | 310/8.7 X |
| 3,614,487 | 10/1971 | Matschek | 310/8.7 X |

Primary Examiner—Mark O. Budd

[57] ABSTRACT

A sensitive element of a piezooptic measuring converter having an insert of a piezooptic material arranged between a foot and a base and rigidly attached thereto by means of their end portions constructed as a plurality of pins, which makes it possible to reduce thermal stresses in the insert more than 20-fold and thus reduce the temperature error of the piezooptic converter produced by these stresses.

8 Claims, 4 Drawing Figures

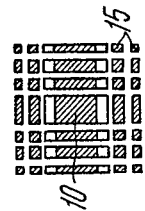
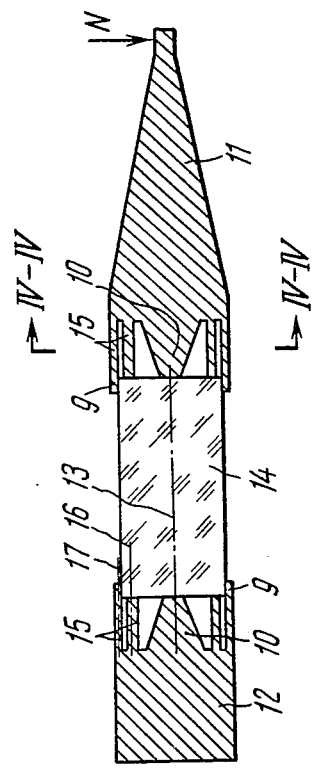
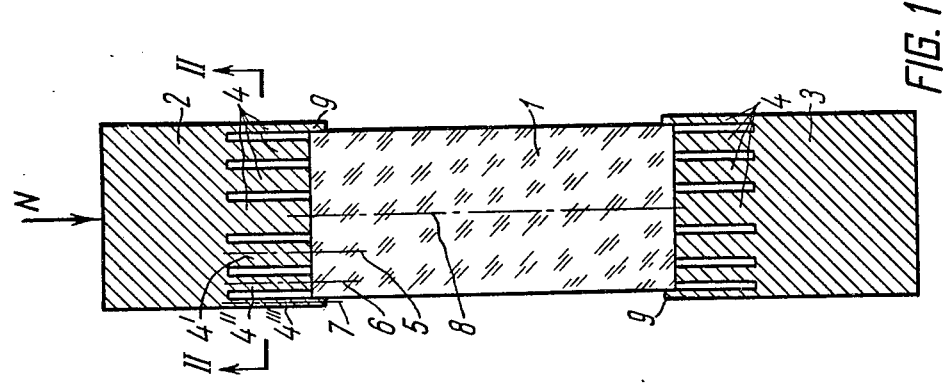

SENSITIVE ELEMENT OF PIEZOOPTIC MEASURING CONVERTER

BACKGROUND OF THE INVENTION

The present invention relates to piezooptic measuring converters and, more particularly, to sensitive elements of piezooptic measuring converters employed in instruments for measuring force, pressure, acceleration, temperature and other values converted into mechanical stresses of a sensitive element.

There are widely known sensitive elements of piezooptic measuring converters. These sensitive elements have an insert of a piezooptic material, arranged between the foot and the base and rigidly attached thereto.

In such sensitive elements the entire end face surfaces of the feet and bases are in contact with the end face surfaces of the inserts. As a result, changes in the temperature of the inserts, feet and bases lead to mechanical stresses due to a different change in their linear dimensions. Added to the mechanical stress due to a physical value being measured, these stresses produce an error signal.

If the temperature of the above-mentioned parts is uniform throughout the volume of these parts and changes uniformly, the temperature error may be reduced by selecting materials for the feet, bases and inserts having, if possible, an equal temperature expansion coefficient. This is not always possible, however, due to differences in this coefficient within different batches of materials of the same type.

Besides, the method of selecting materials having equal thermal expansion coefficients is altogether ineffective when the temperature of the inserts, feet and bases is not equal and changes in a non-uniform manner, as, for example, in the case of a temperature gradient around a sensitive element or a sharp change in temperature.

It is an object of the present invention to provide a design of a sensitive element of a piezooptic measuring converter which would ensure the rigidity of said sensitive element in the direction of the action of a physical phenomenon being measured (in particular, force).

It is another object of the present invention to provide a sensitive element of a piezooptic measuring converter, which would ensure reliable coupling between the insert and the base and foot.

SUMMARY OF THE INVENTION

The foregoing objects are attained by providing a sensitive element of a piezooptic measuring converter having an insert of a piezooptic material disposed between a foot and a base and rigidly fastened thereto, in which element the end portions of the foot and the base, that are in contact with the insert, are made as a plurality of pins.

In order to maintain rigidity in the direction of the action of a force under measurement, it is expedient that in case when the direction of the force is parallel to the longitudinal axes of the pins, for example, in a sensitive element subject to compression, the cross-sectional areas of the pins be in inverse relationship to the distance between the longitudinal axis of each pin and the longitudinal axis of the insert.

In case when the direction of a force being measured is perpendicular to the longitudinal axes of the pins, for example, in a sensitive element subject to bending, one of the pins whose longitudinal axis is matched with that of the insert may be constructed as a truncated pyramid whose lesser base is in contact with the insert.

In order to raise the reliability of the coupling between the insert and the foot and base, it is wise to have the peripheral pins longer than the other pins, so that said peripheral pins would protrude and envelop the insert.

The foregoing design of a sensitive element of a piezooptic measuring converter makes it possible to substantially reduce temperature stresses in the material of the insert for any type of temperature distribution or change throughout the volume of the insert and thus reduce the temperature error of the piezooptic measuring converter; the invention also makes it possible to maintain the rigidity of the sensitive element in the direction of a force being measured, irrespective of a stress it is subject to, which may be compression, tension or bending; finally, the invention ensures reliable coupling between the insert and the foot and base.

BRIEF DESCRIPTION OF THE DRAWINGS

Other objects and advantages of the present invention will become more apparent from the following detailed description of preferred embodiments thereof taken in conjunction with the accompanying drawings, wherein:

FIG. 1 is a longitudinal sectional view of the proposed sensitive element of a piezooptic measuring converter;

FIG. 2 is a section taken along the line II—II of FIG. 1;

FIG. 3 is a longitudinal sectional view of an alternative embodiment of the proposed sensitive element of a piezooptic measuring converter;

FIG. 4 is a section taken along the line IV—IV of FIG. 3.

DESCRIPTION OF THE PREFERRED EMBODIMENTS

The proposed sensitive element of a piezooptic measuring converter, subject to tension, is shown in FIG. 1.

The sensitive element has an insert 1 of a piezooptic material disposed between a foot 2 and a base 3 and rigidly coupled thereto. The end portions of the foot 2 and the base 3, which are in contact with the insert 1, are constructed as a group of pins 4. In the embodiment under review the pins 4 are shaped as rectangular parallelepipeds.

The cross-sectional areas of the pins 4 (FIG. 2) are in inverse relationship to the distance between a longitudinal axis 5, 6, 7 (FIG. 1) of each pin 4 and a longitudinal axis 8 of the insert 1. For example, it is seen from FIGS. 1 and 2 that for a pin 4', the distance between the longitudinal axes 8 and 5 (FIG. 1) is less than the distance between the longitudinal axes 8 and 6 for a pin 4''; for the pin 4'' the distance between the axes 8 and 6 is less than the distance between the axes 8 and 7 for a pin 4'''; whereas the cross-sectional area of the pin 4' (FIG. 2) is greater than that of the pin 4'', and the latter's cross-sectional area is greater than that of the pin 4'''.

The peripheral pins 4''' are longer than the other pins and form a protrusion 9 enveloping the insert 1.

In the embodiment of the present invention the pins 4 in the groups are arranged symmetrically with respect to the longitudinal axis 8 of the insert 1. All the lateral sides of each pin 4 are parallel to the axis 8. The distances between the pins 4 as small as technically possible. This arrangement, however, does not exclude the possibility of asymmetrical arrangement and some other shape of the pins 4.

In the sensitive element shown in FIG. 1, the insert 1 is manufactured from lime silicate glass (it may also be monocrystal) whose properties are altered under the action of mechanical stresses. The foot 2 and the base 3 are made of a durable and rigid material which effectively transfers mechanical stresses. This material, in the present case, is metal. At the places of contact between the foot 2 and the insert 1, and the insert 1 and the base 3, a rigid coupling is effected which is reliable both in cases of tension and compression. In the present case, the coupling is effected through adhesion.

The proposed sensitive element of a piezooptic measuring converter, subject to bending, is shown in FIG. 3.

This sensitive element is analogous to the one of FIG. 1. The difference between the two is that one of pins 10 (FIG. 3) of a foot 11 and a base 12 (the central pin), whose longitudinal axis is matched with a longitudinal axis 13 of an insert 14, is shaped as a truncated pyramid whose lesser base is in contact with the insert 14. The remainder of pins 15 are shaped as rectangular parallelepipeds and have all the characteristic features of the pins 4 (FIG. 1). The cross-sections of the pins 15 and the pin 10 are shown in FIG. 4.

The operating principle of the proposed sensitive element of a piezooptic measuring converter is as follows.

A force N being measured (FIGS. 1 and 3) is transmitted through the foot 2 (FIG. 1) and the base 3 or through the foot 11 (FIG. 3) and the base 12 to the insert 1 (FIG. 1) or the insert 14 (FIG. 3). As a result, mechanical stresses are produced in the insert which are subsequently converted into a useful output signal of the piezooptic measuring converter.

With a change in the temperature of the surrounding medium, the insert 1 (FIG. 1), the foot 2, the base 3, as well as the insert 14 (FIG. 3), the foot 11 and the base 12, alter their dimensions. The rigidity of the pins 4 (FIG. 1) and 15 (FIG. 3), the bases 5 (FIG. 1) and 12 (FIG. 3), and the feet 2 (FIG. 1) and 11 (FIG. 3) is small in the directions perpendicular to the respective longitudinal axes 5, 6, 7 (FIG. 1) and 16, 17 (FIG. 3); the areas of contact of the pins 4 or 10, 15 with the insert 1 or 14 are small; hence, the force components in the complexly stressed state of the insert 1 or 14, which are perpendicular to the longitudinal axes 5, 6, 7 or 16, 17 of the pins 4 or 15, respectively, are considerably weakened. This simplifies and smoothes the force pattern in the complexly stressed state of the insert.

The proposed structure of the end portions of the foot and base of the sensitive element makes it possible to reduce more than 20-fold the temperature induced stresses in the insert, which correspondingly reduces the respective temperature error of the converter.

A decrease in the rigidity of the sensitive element in the direction of the force N (FIG. 1) is proportional to the ratio between the sum total of the cross-sectional areas of the pins 4, the foot 2 or the base 3 and the entire end face surface of the foot or the base. This ratio can easily be made equal to ¾.

A decrease in the cross-sectional area of the pins 4 towards the periphery is due to the fact that the peripheral pins are displaced to the greatest extent as a result of heating, so their transverse rigidity must be less than that of the central pins. The central pin, which is not displaced whatsoever, has a greater cross-sectional area than the peripheral pins.

If the sensitive element is subject to bending (FIG. 3), the rigidity in the direction of the force N is maintained by making the central pin 10 of the foot 11 and the base 12 in the form of a truncated pyramid whose longitudinal axis is matched with the axis 13 of the insert 14. The lesser base of the pin 10 is directed towards the insert 14 and is in contact with the latter.

The arrangement of the pins 4 (FIG. 1) and 15 (FIG. 3) symmetrically with respect to the planes parallel to their lateral sides and passing through the longitudinal axis 8 (FIG. 1) of the insert 1, and parallel to their lateral sides and passing through the axis 13 (FIG. 3) of the insert 14, is optimum from the point of view of symmetry of the distribution of heat fluxes and symmetry of stresses.

What is claimed is:
1. A sensitive element of a piezooptic measuring converter, comprising: a foot whose end portion is made as a plurality of pins having longitudinal axes; an insert of a piezooptic material, having a longitudinal axis and a first and a second end face surfaces, the first of said end face surfaces being rigidly attached to said pins of said foot; a base whose end portion is constructed as a plurality of pins having longitudinal axes and rigidly attached to the second end face surface of said insert.

2. A sensitive element of a piezooptic measuring converter as claimed in claim 1, having pins whose cross-sectional areas are in inverse relationship to the distance between said longitudinal axis of each of said pins and said longitudinal axis of said insert.

3. A sensitive element of a piezooptic measuring converter as claimed in claim 1, wherein one of the pins of said foot and base, whose longitudinal axis is matched with said longitudinal axis of said insert, is shaped as a truncated pyramid whose lesser base is in contact with said insert.

4. A sensitive element of a piezooptic measuring converter as claimed in claim 1, wherein the peripheral pins of said foot and base are longer than the rest of the pins and form a protrusion enveloping said insert.

5. A sensitive element of a piezooptic measuring converter as claimed in claim 2, wherein one of the pins of said foot and base, whose longitudinal axis is matched with said longitudinal axis of said insert, is shaped as a truncated pyramid whose lesser base is in contact with said insert.

6. A sensitive element of a piezooptic measuring converter as claimed in claim 2, wherein the peripheral pins of said foot and base are longer than the rest of the pins and form a protrusion enveloping said insert.

7. A sensitive element of a piezooptic measuring converter as claimed in claim 3, wherein the peripheral pins of said foot and base are longer than the rest of the pins and form a protrusion which envelops said insert.

8. A sensitive element of a piezooptic measuring converter as claimed in claim 5, wherein the peripheral pins of said foot and base are longer than the rest of the pins and form a protrusion which envelops said insert.

* * * * *